United States Patent [19]

Newman et al.

[11] Patent Number: 5,077,345

[45] Date of Patent: Dec. 31, 1991

[54] HALOGENATION OF POLYMERS WITH IMPROVED NEUTRALIZATION

[75] Inventors: Neil F. Newman, Edison; Irwin J. Gardner, Scotch Plains, both of N.J.

[73] Assignee: Exxon Chemical Patents Inc., Linden, N.J.

[21] Appl. No.: 486,773

[22] Filed: Mar. 1, 1990

[51] Int. Cl.$^5$ ............................. C08F 8/20; C08F 8/22
[52] U.S. Cl. ................................. 525/355; 525/332.8; 525/333.3; 525/333.4; 525/356; 525/357; 525/358; 525/359.1; 525/359.2; 525/359.3; 525/359.4; 525/359.5; 525/359.6
[58] Field of Search ............... 525/355, 356, 357, 358, 525/359.1, 359.2, 359.3, 359.4, 359.5, 359.6

[56] References Cited

U.S. PATENT DOCUMENTS 2,732,354 1/1956 Morrissey et al. ..................... 260/5

FOREIGN PATENT DOCUMENTS 746692 3/1956 United Kingdom .

*Primary Examiner*—Bernard Lipman
*Attorney, Agent, or Firm*—M. L. Gibbons

[57] ABSTRACT

A halogenation process is provided for halogenating a polymer, in which process the halogenation reaction product is neutralized by reaction of an aqueous alkaline material in the presence of a critical limited amount of alcohol to increase the neutralization rate.

17 Claims, No Drawings

HALOGENATION OF POLYMERS WITH IMPROVED NEUTRALIZATION

BACKGROUND OF THE INVENTION

1. Field of the Invention

The present invention relates to a halogenation process for polymers with improved neutralization of the hydrogen halide by-product resulting from the halogenation.

2. Description of Information Disclosures

Halogenation processes in which a polymer is reacted with a halogenation agent to produce a halogenated polymer containing chemically bound halogen and a hydrogen halide by-product followed by neutralization of the hydrogen halide by-product by contacting the halogenation reaction product with an alkaline material which reacts with the hydrogen halide by-product are well known.

It would be desirable to increase the rate of neutralization to minimize the possibility of incomplete neutralization, discoloration of the halogenated polymer and, thereby, increase the stability and consistency of the halogenated polymer.

The neutralization reaction rate for neutralizing a halogenation reaction product comprising certain halogenated polymers, which will be subsequently described, is particularly slow and in need of improvement.

U.S. Pat. No. 2,732,354 discloses chlorination of an interpolymer of an isoolefin and a polyolefin dissolved in a solvent. The halogenation reaction product is neutralized in an equivalent amount of potassium hydroxide in methanol (see col. 6, lines 44 to 47).

British patent 746,692 discloses reacting iodine monochloride in carbon tetrachloride with an interpolymer of isobutylene and isoprene dissolved in heptane to produce the corresponding iodine and chlorine—containing interpolymer, and neutralizing the product with an equivalent amount of potassium hydroxide dissolved in methanol (see col. 5, lines 92 to 95).

It has now been found that the presence of a critical limited amount of an alcohol during the aqueous neutralization reaction of the halogenation product will increase the neutralization rate.

SUMMARY OF THE INVENTION

In accordance with the invention, there is provided, in a process for halogenating a polymer selected from the group consisting of a copolymer of a $C_4$ to $C_7$ isomonoolefin and a $C_4$ to $C_{14}$ multiolefin, a copolymer of a $C_4$ to $C_7$ isomonoolefin and a paraalkylstyrene, and mixtures thereof, which comprises the steps of:

(a) halogenating said polymer with a halogenating agent to produce a reaction product comprising the corresponding halogenated polymer and hydrogen halide;

(b) neutralizing said hydrogen halide by contacting said reaction product with an aqueous alkaline material to react with said hydrogen halide at neutrali-zation conditions, and (c) recovering said halogenated polymer, the improvement which comprises conducting said neutralization step in the presence of a $C_1$ to $C_6$ aliphatic alcohol, in an amount ranging from about 0.05 to about 5 weight percent, based on the weight of said halogenated polymer.

DETAILED DESCRIPTION OF THE INVENTION

A halogenation reaction product comprising a rubbery polymer containing a chemically bound halogen, such as chlorine, bromine, iodine and mixtures thereof, and a hydrogen halide by-product is contacted with an aqueous alkaline material to neutralize the hydrogen halide by-product. The halogenated polymer may be present in the neutralization step dissolved in an organic solvent such as a hydrocarbon or halogenated derivative of a hydrocarbon, for example, hexane, heptane, naphtha, branched chain paraffins, straight chain mineral spirits, cyclohexane, other cycloparaffins, benzene, toluene, chloroform and the like. When the halogenated polymer is dissolved in a solvent, the preferred solvents are $C_3$ to $C_{12}$, preferably $C_4$ to $C_8$ substantially inert hydrocarbons such as hexane, cyclohexane, cyclopentane, n-heptane, n-pentane and mixtures thereof.

Suitable aqueous alkaline materials include alkali metal hydroxides, particularly, sodium hydroxide, ammonium hydroxide, carbonates or bicarbonates of alkali metals and ammonium in an aqueous solution. The aqueous alkaline material is used in an amount sufficient for the alkaline material to react with the undesired hydrogen halide by-product and, thereby, neutralize the hydrogen halide. The neutralization step is generally conducted at a temperature ranging from about minus 10° C. to about 100° C., preferably from about 20° to 75° C. and at a pressure ranging from about 0 to 100 psig, preferably from about 80 to 100 psig for a time sufficient to neutralize the hydrogen halide, that is, until the pH of the neutralization mixture is above about 7, preferably above about 8. The neutralization of the halogenation reaction product comprising halogenated polymers is relatively slow, particularly, when brominated polymers are present and particularly star-branched bromobutyl rubber, and brominated p-alkylstyrene rubbers which contain an aromatic moiety. In accordance with the present invention, an aliphatic alcohol containing from 1 to 6 carbon atoms, preferably from 1 to 4 carbon atoms, such as for example, isopropanol, n-propanol, methanol, is present in the neutralization reaction zone in an amount ranging from about 0.05 to 5.0, preferably 0.25 to 20 weight percent, based on the weight of the halogenated polymer to increase the rate of the neutralization reaction. Optionally, other additives may be present or added to the neutralization reaction zone, such as, for example, calcium stearate epoxidized soybean oil, and non-ionic surfactants. The halogenated polymer is recovered from the neutralization reaction mixture by any of the conventional processes.

Suitable halogen-containing polymers comprised in the halogenation reaction product of the present invention are selected from halogenated copolymers of a $C_4$ to $C_7$ isomonoolefin and a $C_4$ to $C_{14}$ multiolefin (i.e. halobutyl rubber), including a halogenated star-branched copolymer of a $C_4$ to $C_7$ isomonoolefin and a $C_4$ to $C_{14}$ multiolefin, i.e., star-branched halobutyl rubber, a halogenated $C_4$ to $C_7$ isomonoolefin and a paraalkylstyrene, and mixtures thereof.

THE HALOGEN-CONTAINING POLYMERS

The halogen-containing polymers suitable for the neutralization step of the present invention include:

A. Halogen-containing $C_4$ to $C_7$ isomonoolefin and a $C_4$ to $C_{14}$ multiolefin (e.g. halogenated star-branched butyl rubber).

B. Halogen-containing copolymers of a $C_4$ to $C_7$ isomonoolefin and a para-alkylstyrene.

The characteristics of these halogen-containing polymers and methods for their preparation are as follows:

A. Halogen-containing copolymers of a $C_4$ to $C_7$ isomonoolefin and a $C_4$ to $C_{14}$ multiolefin.

The halogen-containing copolymers of an isomonoolefin and a multiolefin are obtained by the halogenation of a copolymer of a $C_4$ to $C_7$ isomonoolefin and a $C_4$ to $C_{14}$ multiolefin, hereinafter referred to as "butyl rubber".

The useful copolymers comprise a major portion of isomonoolefin and a minor amount, preferably not more than 30 wt. percent, of a conjugated multiolefin. The preferred copolymers comprise about 85–99.5 wt. percent (preferably 95–99.5 wt. percent) of a $C_4$–$C_7$ isomonoolefin, such as isobutylene, and about 15 to 0.5 wt. percent (preferably about 5–0.5 wt. percent) of a multiolefin of about 4–14 carbon atoms. These copolymers are referred to in the patents and literature as "butyl rubber"; see, for example, the text-book *Synthetic Rubber* by G. S. Whitby (1954 edition by John Wiley and Sons, Inc.), pages 608–609, etc. The term "butyl rubber", as used herein, includes the aforementioned copolymers of an isomonoolefin having 4–7 carbon atoms and a conjugated multiolefin having about 4–14 carbon atoms. Preferably these copolymers contain about 0.5 to about 5 percent conjugated multiolefin. The preferred isomonoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst, is soluble in it, as are the isobutylene and isoprene comonomers. Additionally, the butyl rubber polymer is insoluble in the methyl chloride and precipitates out of solution as fine particles. The polymerization is generally carried out at temperatures of about $-90°$ C. to $-100°$ C. See U.S. Pat. Nos. 2,356,128 and 2,356,129 incorporated herein by reference.

The polymerization process, which is typically carried out in a draft tube reactor, is continuous. Monomer feed and catalyst are continuously introduced at the bottom of the draft tube where an axial flow pump is located. The pump circulates the slurry at high velocity to provide efficient mixing and heat transfer. Polymer slurry containing about 20–30 wt. percent butyl rubber continuously overflows from the reactor through a transfer line.

Where the desired product is the butyl rubber itself, the slurry is fed through the transfer line to a flash drum operated at about 140–180Pa (1.38–1.58 atmospheres) and 65°–75° C. Steam and hot water are mixed with the slurry in a nozzle as it enters the drum to vaporize methyl chloride and unreacted monomers which pass overhead, are recovered, and the polymer is finished by water removal and drying. Where, however, it is desired to produce a halogenated butyl rubber, this can be accomplished by preparing a solution of the rubber. Any halogenation technique may be utilized.

In one preferred method of halogenation, a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process, butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The halogenated butyl rubbers useful as starting material of the invention are halogenated to comprise from about 0.05 to about 5 percent chemically bound halogen. When the halogen is chlorine, the preferred amount of chemically bound chlorine ranges from about 0.1 to about 2.0 weight percent. When the halogen is bromine, the preferred amount of chemically bound bromine ranges from about 0.2 to about 4.0 weight percent.

The butyl rubber subjected to the halogenation step may be a star-branched butyl rubber such as those described in European Patent Application 88311634.5, filed December 8, 1988 (Publication No. 1989/2 published Jun. 14, 1989). The star-branched butyl rubber is also described in a paper entitled *"Star-branched Butyl", A Novel Butyl Rubber For Improved Processability* presented at the Rubber Division of the American Chemical Society, Mexico City, Mexico May 9–12, 1989 by I. Duvdevani, et al. The star-branched butyl rubbers have highly branched structures by incorporating, during polymerization, crosslinking or cationally active comonomers or agents. These agents are referred to as branching agents and preferably are, or contain, structural features which are soluble in the polymerization diluent. More preferably, such branching agents are used in conjunction with, or are themselves, stabilizers for the polymer slurry when such a slurry results, e.g., butyl rubber in methyl chloride (see U.S. Pat. Nos. 4,242,710, 4,358,560 and 4,474,924).

The introduction of branching, preferably long chain branching, results in a modification of the molecular weight distribution, and molecular chain configuration.

The nature of the polymerization diluent can have important effects on the polymer produced. Similarly important is the solubility of the branching agent under polymerization conditions throughout the entire course of the polymerization. As butyl is normally produced by slurry polymerization in methyl chloride diluent, the polymer precipitates out of solution as it is formed. Consequently, when a branching agent is incorporated, it is removed from solution and may become buried within the polymer particle so that the additional sites are no longer available in the solution phase for subsequent reaction. The actual branching reactions may be forced to occur within the precipitated butyl polymer in a very different and much more poorly controlled way than had the branching agent remained in solution. Gel formation is much more likely when the reactions occur within the precipitated polymer than when they occur more homogeneously in the solution phase. Furthermore, the amount and nature of the gel produced is highly dependent upon the catalyst quenching conditions and control is rendered very difficult. Solution polymerization of butyl rubber in diluents such as aliphatic hydrocarbons e.g., pentane, hexane, or heptane is advantageous from a control viewpoint, when it is desired to produced highly branched polymers. Optimum control of the branching reactions is achieved when they are totally effected homogeneously in solution and then all catalyst and active species are killed by quenching prior to precipitation of the polymer. As noted above, this can be accomplished by polymerizing butyl rubber in a suitable inert diluent which is a good solvent for the polymer and the branching agent. However, branched structures, which significantly modify the molecular weight distribution can also be achieved through the inclusion of reactor-diluent-soluble moieties containing multiple, cationically reactive sites, particularly in conjunction with slurry stabilizers.

Slurry stabilizers stabilize butyl dispersions produced during polymerization in a diluent such as methyl chloride, and prevent the mass agglomeration of slurry particles. Hence, slurry stabilizers make it possible to produce dispersed butyl particles containing gel in the reactor without depositing fouling rubber containing gel on the heat transfer surfaces. Through the use of slurry stabilizers it is possible to produce a modified butyl rubber containing as much branching and/or gel as is desired in a practical manner without interfering with the ability to wash the reactor in order to prepare it for reuse.

Furthermore, through appropriate choice of the branching agent and the amount used, it is possible to exert considerable control over the branching process so that the desired changes in molecular weight distribution are achieved. Since crosslinking agents tend to introduce random long chain branching, they modify the entire molecular weight distribution of the polymer. On the other hand, soluble moieties containing multiple reactive sites can be used to introduce a controlled amount of a high molecular weight branched fraction into the distribution without modifying the entire molecular weight distribution of the polymer. A small amount of a very highly functional and reactive soluble moiety can be used to introduce a small amount of very high molecular weight highly branched material into the distribution. Conversely, a larger amount of a less reactive, lower functionality moiety can be used to introduce more of the branched fraction, but of lower molecular weight.

The cationically reactive branching agents for use in producing the star-branched polymers are present during polymerization in an amount effective for producing the desired changes in molecular weight distribution. Such amounts vary depending on the number and reactivity of the cationically active species, including such variables as molecular weight and reactivity of the agent (particularly that portion of the agent containing the cationically active moiety). Additionally, polymerization conditions influence the effective concentration, e.g., batch versus continuous, temperature, monomer conversion, etc. Generally such agents are present in an amount, based on the monomers, greater than about 0.3 weight percent e.g., about 0.3 to about 3.0 weight percent, preferably greater than about 0.35 weight percent, e.g., about 0.35 to about 2.8 weight percent, more preferably greater than about 0.4 weight percent, e.g., about 0.4 to about 2.7 weight percent, e.g., about 0.45 to about 2.6 weight percent, for example greater than about 0.5 weight percent e.g., about 0.5 to about 2.5 weight percent. Reagents which are not excessively reactive can be used in a commercial process at, e.g., about 1.1 to about 2.0 weight percent. The upper limit of concentration is limited to that concentration which causes the final polymer product to be gelled to an extent which is unacceptable for the intended use of the product.

A particularly desirable method of introducing the desired high molecular weight ends branching is to combine the functions of the slurry stabilizer and the branching agent in one species by use of a slurry stabilizer with multiple active sites in an anchor group. The lyophilic portion of the slurry stabilizer solubilizes the anchor group, which contains multiple active sites to produce the desired branched fraction during polymerization, and the lyophilic portion then forms the protective shield around the butyl slurry particles to provide steric slurry stabilization. Block copolymers of polystyrene and polybutadiene or polystyrene and polyisoprene are examples of molecules which combine the functions of slurry stabilization and branching agent when butyl rubbers are polymerized in methyl chloride diluent as in commercial butyl rubber processes. The crosslinking comonomer and/or species containing multiple reactive sites is preferentially soluble under polymerization conditions because then it is more effectively utilized and the branching reactions can be controlled better. Since the crosslinking comonomers are typically low molecular weight liquids, they are soluble in the polymerization diluent of interest, but species containing multiple reactive sites are normally polydienes with limited solubility in the normal butyl polymerization diluent (e.g., methyl chloride) under reaction conditions. The solubility requirement often limits the molecular weight of polydiene which can be used unless it also contains groups which enhance methyl chloride solubility. The choice of these solubilizing groups is restricted by the consideration that they must not poison the polymerization catalyst used or interfere with the polymerization. As noted above, it is particularly desirable that the solubilizing group be a lyophilic polymeric chain that can act as a slurry stabilizer so that it serves dual functions. The use of solubilizing groups makes it possible to utilize higher molecular weight polydienes during slurry polymerization of butyl rubbers in methyl chloride diluent and, hence, makes possible the production of a more highly branched, high molecular weight mode during polymerization. The polymerization diluent can also be changed to one in which the polydiene is more soluble but such a major process change is less desirable from economic and process viewpoints.

B. Halogen-containing copolymers of a $C_4$ to $C_7$ isomonoolefin and a para-alkylstyrene.

The copolymers of isomonoolefin and a para-alkylstyrene useful to prepare halogenated polymers suitable as polymers for the neutralization step of the present invention include copolymers of an isomonoolefin having from 4 to 7 carbon atoms and a para-alkylstyrene in which the copolymer has a substantially homogeneous compositional distribution, such as those described in European patent application 89305395.9 filed May 26, 1989 (publication No. 0344021 published November 29, 1989). The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{M}_n$) of at least about 500, preferably at least about 25,000 and more preferably at least about 30,000. The copolymers also, preferably, have a ratio of weight average molecular weight ($\overline{M}_w$) to number average molecular weight ($\overline{M}_n$), i.e., $\overline{M}_w/\overline{M}_n$ of less than about 6, more preferably less than about 4, even more preferably less than about 2.5, most preferably less than about 2. The copolymers may comprise from about 80 to about 99.5 wt. percent of the isomonoolefin such as isobutylene, and from about 0.5 to about 20 wt. percent of the para-alkylstyrene such as para-methylstyrene. Alternatively, the isobutylene may be present in an amount ranging from about 10 to about 99.5 percent and the para-alkylstyrene from about 0.5 to about 90 wt. percent.

The copolymers useful in the practice of the present invention include the para-alkylstyrene represented by the formula:

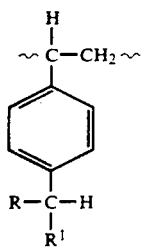

in which R and $R^1$ are independently selected from the group consisting of hydrogen, alkyl, primary alkyl halides, secondary alkyl halides, and mixtures thereof. Preferably R and $R^1$ are hydrogen, $C_1$ to $C_5$ alkyl, or $C_1$ to $C_5$ primary or secondary alkyl and most preferably R and $R^1$ are hydrogen.

Various methods may be used to produce the copolymers of isomonoolefin and para-alkylstyrene.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The copolymers of isomonoolefin and para-alkylstyrene may be produced by admixing the isomonoolefin and the para-alkylstyrene in a copolymerization reactor under copolymerization conditions in the presence of a diluent, and a Lewis acid catalyst and maintaining the copolymerization reactor substantially free of impurities which can complex with the catalyst or which can copolymerize with the isomonoolefin or the para-alkylstyrene.

The copolymers which are produced as a direct reaction product in their polymerized form have a substantially homogeneous compositional distribution.

The isomonoolefins such as, for example, isobutylene and the para-alkylstyrene such as, for example, para-methylstyrene, are readily copolymerized under cationic conditions. In the following description, for simplicity of description, the isomonoolefin will be referred to as "isobutylene" and the para-alkylstyrene will be referred to as "para-methylstyrene", although the method of production described is applicable to the copolymers of isomonoolefins and para-alkylstyrene. The polymerization of the para-methylstyrene and isobutylene can be carried out by means of a Lewis acid catalyst. Suitable Lewis acid catalysts (including Friedel Crafts catalysts) include those which show good polymerization activity with a minimum tendency to promote alkylation transfer and side reactions which can lead to branching and to the production of cross-linking resulting in gel-containing polymers with inferior properties. The preferred catalysts are Lewis acids based on metal from Group IIIA, IV and V of the Periodic Table of Elements, including boron, aluminum, gallium, indium, titanium, zirconium, tin, vanadium, arsenic, antimony and bismuth. The Periodic Table referred to herein is in accordance with the Table published by Sargent-Welch, Copyright 1968, Sargent-Welch Scientific Company. The Group III Lewis acids have the general formula $R_mMX_n$ wherein M is a Group IIIA metal, R is a monovalent hydrocarbon radical selected from the group consisting of $C_1$ to $C_{12}$ alkyl, aryl, arylalkyl and cycloalkyl radicals; m is a number ranging from 0 to 3; X is a halogen independently selected from the group consisting of fluorine, chlorine, bromine and iodine; and the sum of M and n is equal to 3. Non-limiting examples include aluminum chloride, aluminum bromide, boron trifluoride, ethyl aluminum dichloride ($EtAlCl_2$) diethyl aluminum chloride ($Et_2AlCl_{1.5}$), ethyl aluminum sesquichloride ($Et_{1.5}AlCl_{1.5}$), trimethyl aluminum and triethyl aluminum. The Group IV Lewis acids have the general formula $MX_4$ wherein M is a Group IV metal and X is a ligand, preferably a halogen. Non-limiting examples include titanium tetrachloride, zirconium tetrachloride or tin tetrachloride. The Group V Lewis acids have the general formula $MX_y$ wherein M is a Group V metal, X is a ligand, preferably a halogen, and Y is an integer from 3 to 5. Non-limiting examples include vanadium tetrachloride and antimony pentafluoride.

The preferred Lewis acid catalyst may be used singly or in combination with cocatalysts such as Bronsted acids such as anhydrous HF or HCl or alkylhalides such as benzyl chloride or tertiary butyl chloride. In particular, the most preferred catalysts are those which can be classified as weaker alkylation catalysts, and these are thus the weaker Lewis acids from among the catalysts set forth above. These most preferred catalysts such as ethyl aluminum dichloride and preferably mixtures of ethyl aluminum dichloride with diethyl aluminum chloride are not the catalysts which are normally preferred for use in conventional alkylation reactions, since again in the present embodiment there is a strong desire to minimize side reactions, such as the indanyl ring formation which would be more likely to occur with those catalysts normally used to promote conventional alkylation reactions. The amount of such catalysts employed will depend on the desired molecular weight and the desired molecular weight distribution of the copolymer being produced, but will generally range from about 20 ppm to 1 wt. percent and preferably from about 0.001 to 00.2 wt. percent, based upon the total amount of monomer to be polymerized.

Suitable diluents for the monomers, catalyst and polymeric reaction products include the general group of aliphatic and aromatic hydrocarbons used singly or in a mixture and $C_1$ to $C_6$ halogenated hydrocarbons used in admixture with hydrocarbon diluents in an amount up to about 100 percent by volume of the total diluent fed to the reaction zone. Typically, when the monomers are soluble in the selected diluent, the catalyst may not necessarily also be soluble therein.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible. At higher slurry concentrations, it is possible to operate a more efficient process in which it is necessary to recycle less of the reactants and diluents for each unit of polymer produced. For example, at 33 percent slurry concentration, it is only necessary to recycle two units of unreacted reactant and diluent for each unit of polymer. In any event, the amount of diluent fed to the reaction zone should be sufficient to maintain the concentration of polymer in the effluent leaving the reaction zone below about 60 wt. percent and preferably in the range of about 5 to 35 wt. percent, depending upon the process being used and the molecular weight of polymer being produced. Too high a concentration of polymer is generally undesirable for several reasons, including poor temperature control, rapid reactor fouling and the production of gel. Polymer concentrations which are too high will raise the viscosity in the reactor and require excessive power input to ensure adequate mixing and the maintenance of effective heat transfer. Such inadequate mixing and loss of heat transfer efficiency can thus result in localized high monomer concentration and hot spots in the reactor which can, in turn, cause fouling of reactor surfaces. Typical examples of the diluents which may be used alone or in a mixture include propane, butane, pentane, cyclopentane, hexane, toluene, heptane, isooctane, etc. and various halohydrocarbon solvents which are particularly advantageous herein, including methylene, chloride, chloroform, carbon tetrachloride, methyl chloride, with methyl chloride being particularly preferred.

It should also be noted that with any particular monomers (for example isobutylene and para-methylstyrene), as the compositional distribution of the feed is altered therebetween, in order to maintain either a slurry or solution polymerization, it can be necessary to change the diluents employed, depending upon the effect on the solubility of the copolymer in the diluent as the ratio of the monomers utilized therein is altered. As noted above, an important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the process of the present invention. Most particularly, these impurities include the catalyst poisoning material, moisture and other copolymerizable monomers, such as, for example, meta-alkylstyrenes and the like. These impurities should be kept out of the system.

In general the polymerization reaction for the desired copolymer is carried out by mixing the para-methyl-styrene and isobutylene in the presence of the catalyst (such as Lewis acid catalyst) and diluent in a copolymerization reactor, with thorough mixing, and under copolymerization conditions, including temperatures of less than about 0° C., in the case of lower molecular weight polymers and providing a means of removing the heat of polymerization in order to maintain a desired reaction temperature. In particular, the polymerization may be carried out under batch conditions of cationic polymerization, such as in an inert phase atmosphere in the substantial absence of moisture. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. These reactors are large heat exchangers in which the reactor contents are rapidly circulated through rows of heat exchange tubes which are surrounded by boiling ethylene so as to remove the heat of polymerization, and then through a central draft tube by means of an efficient marine-type impellor. Catalysts and monomers are introduced continuously into the reactor and mixed by the pump, and reactor effluent then overflows into a steam-heated flash tank. Heat of polymerization can also be removed by a pump-around loop in which the reactor contents are continuously circulated through an external heat exchanger in such a pump-around loop and an effluent overflow to a holding drum or quench tank. The reactor is purged of air and moisture and charged with dry, purified solvent or a mixture of solvent prior to introducing monomers and catalysts.

The thus produced copolymers of a $C_4$ to $C_7$ isomonoolefin and a para-alkylstyrene are halogenated, as previously described with reference to butyl rubber. The halogenation reaction product is neutralized as previously herein described.

The following examples are presented to illustrate the invention. Unless otherwise indicated, all parts and percentages are by weight.

EXAMPLE 1

A 15 percent hexane solution of star-branched butyl rubber comprising 1.1 percent of KR01-K-Resin ® (Phillips Chemical Company) incorporated in the butyl chains and 0.8 percent polystyrene in hexane was brominated at 25° C. using molecular bromine for 2 minutes and, subsequently, was neutralized with aqueous sodium bicarbonate. KR01-K-Resin ® is a styrene/butadiene block copolymer. Its composition is 62 mole percent styrene and 38 mole percent butadiene, with a viscosity average molecular weight of 140,000 by toluene solution viscosity. The neutralization rate was measured by the volume of carbon dioxide evolved. Two measures of rate were calculated as follows: (1) the maximum rate of carbon dioxide evolution, and (2) an approximate first-order rate constant for the reaction (k. $min^{-1}$). The results are shown in Table I.

TABLE I

| Experiment | i-PrOH (1) % on rubber | Max. ml $CO_2$/minutes | k. min$^{-1}$ |
|---|---|---|---|
| I | 0 | 230 | 0.30 |
| II | 0.5 | 600 | 1.1 |

(1) i-PrOH denotes isopropyl alcohol

Experiment I, which was conducted in the absence of added alcohol, is not an experiment in accordance with the present invention.

Experiment II, which was conducted in the presence of 0.5 percent of added isopropyl alcohol, is an experiment in accordance with the present invention.

EXAMPLE 2

A 15 percent cement of the same star-branched butyl cement used in Example 1 was brominated using molecular bromine for 2 minutes and subsequently, was neutralized by stirring vigorously with an aqueous solution of sodium hydroxide in which was suspended calcium stearate. The product was isolated by steam stripping and drying on a hot rubber mill, and examined by infrared spectroscopy. Incomplete neutralization is shown by the presence of stearic acid from the combination of residual (non-neutralized) HBr with the calcium stearate. The presence of substantially only calcium stearate in the final polymer is indicative of efficient neutralization. The results are shown in Table II.

TABLE II

| Experiment | (1) i-PrOH, % on rubber | Neutralization time, minutes | Stearate in Product |
|---|---|---|---|
| III | 0 | 2 | (2) HSt |
| IV | 0 | 48 | (3) $CaSt_2$ + HSt |
| V | 0.25 | 2 | $CaSt_2$ |
| VI | 0.50 | 2 | $CaSt_2$ |
| VII | 0.10 | 2 | $CaSt_2$ |

Footnotes
(1) i-PrOH denotes isopropyl alcohol
(2) HSt denotes stearic acid
(3) $CaSt_2$ denotes calcium stearate Experiments III and IV, in which the neutralization was conducted in the absence of added alcohol, are not experiments in accordance with the present invention. Experiments V, VI, and VII, in which the neutralization was conducted in the presence of added isopropyl alcohol, are experiments in accordance with the present invention.

What is claimed is:

1. In a process for halogenating a polymer selected from the group consisting of a copolymer of a $C_4$ to $C_7$ isomonoolefin and a $C_4$ to $C_{14}$ multiolefin, a copolymer of a $C_4$ to $C_7$ isomonoolefin and a para-alkylstyrene, and mixtures thereof, which comprises the steps of:
   (a) halogenating said polymer with a halogenating agent to produce a reaction product comprising the corresponding halogenated polymer and hydrogen halide;
   (b) neutralizing said hydrogen halide by contacting said reaction product with an aqueous alkaline material to react with said hydrogen halide at neutralization conditions, and
   (c) recovering said halogenated polymer, the improvement which comprises conducting said neutralization step in the presence of a $C_1$ to $C_6$ aliphatic alcohol, in an amount ranging from about 0.05 to about 5 weight percent, based on the weight of said halogenated polymer.

2. The process of claim 1, wherein said alcohol is present in an amount ranging from about 0.25 to about 2.0 weight percent, based on the weight of said halogenated polymer.

3. The process of claim 1, wherein said alcohol is selected from the group consisting of isopropyl alcohol n-propanol, methanol, and mixtures thereof.

4. The process of claim 1, wherein said neutralization is conducted in the additional presence of an additive selected from the group consisting of calcium stearate, epoxidized soybean oil, non-ionic surfactants, and mixtures thereof.

5. The process of claim 1, wherein said halogenating agent is selected from the group consisting of chlorine, bromine, iodine; compounds which liberate chlorine, bromine, and iodine; and mixtures thereof.

6. The process of claim 1, wherein said halogenating agent is selected from the group consisting of molecular bromine, a compound which liberates molecular bromine, molecular chlorine, a compound which liberates molecular chlorine, and mixtures thereof.

7. The process of claim 1, wherein said neutralization conditions include a temperature ranging from about minus 10° C. to about 100° C., and a pressure ranging from about 0 to about 100 psig.

8. The process of claim 1, wherein said halogenated polymer comprises a halogen-containing copolymer of a $C_4$ to $C_7$ isomonoolefin and a $C_4$ to $C_{14}$ multiolefin.

9. The process of claim 8 wherein said isomonoolefin is isobutylene and wherein said multiolefin is isoprene.

10. The process of claim 8, wherein said halogenated polymer is a star-branched copolymer of said halogen-containing copolymer of a $C_4$ to $C_7$ isomonoolefin and a $C_4$ to $C_{14}$ multiolefin.

11. The process of claim 10, wherein said isomonoolefin is isobutylene and said multiolefin is isoprene.

12. The process of claim 1, wherein said halogenated polymer is a halogen-containing copolymer of a $C_4$ to $C_7$ isomonoolefin and a para-alkylstyrene.

13. The process of claim 12, wherein said isomonoolefin is isobutylene and said para-alkylstyrene is para-methylstyrene.

14. The process of claim 1, wherein said halogenated polymer of step (a) is dissolved in an organic solvent.

15. The process of claim 14, wherein said organic solvent is selected from the group consisting of hydrocarbons, halogenated hydrocarbon derivatives, and mixtures thereof.

16. The process of claim 1, wherein said halogenating agent is selected from the group consisting of molecular bromine, a compound which liberates bromine, and mixtures thereof.

17. The process of claim 1, wherein said halogenated polymer of step (a) is selected from the group consisting of a star branched bromobutyl rubber, and a brominated para-alkylstyrene rubber which contains an aromatic moiety.

* * * * *